(12) United States Patent
Yu et al.

(10) Patent No.: US 8,747,987 B2
(45) Date of Patent: Jun. 10, 2014

(54) ULTRA THICK BAMBOO-WOOD COMPOSITE PANEL, ULTRA THICK SOLID WOOD COMPOSITE PANEL AND MANUFACTURING METHODS THEREOF

(75) Inventors: Wenji Yu, Beijing (CN); Yanglun Yu, Beijing (CN); Yue Zhou, Beijing (CN); Rongxian Zhu, Beijing (CN); Dinghua Ren, Beijing (CN)

(73) Assignee: Research Institute of Wood Industry, Chinese Academy of Forestry, Beijing (CN)

( * ) Notice: Subject to any disclaimer, the term of this patent is extended or adjusted under 35 U.S.C. 154(b) by 412 days.

(21) Appl. No.: 13/142,111

(22) PCT Filed: Dec. 22, 2009

(86) PCT No.: PCT/CN2009/075823
§ 371 (c)(1),
(2), (4) Date: Jul. 15, 2011

(87) PCT Pub. No.: WO2010/072139
PCT Pub. Date: Jul. 1, 2010

(65) Prior Publication Data
US 2011/0274872 A1 Nov. 10, 2011

(30) Foreign Application Priority Data

Dec. 24, 2008 (CN) .......................... 2008 1 0240988
Dec. 24, 2008 (CN) .......................... 2008 1 0240989
Feb. 13, 2009 (CN) ...................... 2009 2 0105908 U (51) Int. Cl.
*B32B 21/14* (2006.01)
*B27J 7/00* (2006.01)
*B27D 1/00* (2006.01)
*B32B 3/10* (2006.01)

(52) U.S. Cl.
USPC .............. 428/106; 428/98; 428/105; 144/352

(58) Field of Classification Search
USPC .............................. 428/106, 98, 105; 144/352
See application file for complete search history.

(56) References Cited

U.S. PATENT DOCUMENTS 5,643,983 A 7/1997 Lee
2010/0252181 A1* 10/2010 Wellwood et al. ............ 156/182

(Continued)

FOREIGN PATENT DOCUMENTS

CN 1346734 A 5/2002
CN 1177677 C 12/2004

(Continued)

OTHER PUBLICATIONS

Int'l Search Report for PCT/CN2009/075823 (English translation, six pages), mailed Apr. 1, 2010.

(Continued)

*Primary Examiner* — Brent O'Hern
(74) *Attorney, Agent, or Firm* — Nixon & Vanderhye PC (57) ABSTRACT

A composite panel and its manufacture are described. Ultra-thick bamboo/wood and solid wood composite panels are comprised of core board, surface board and back board. The core board is composed of ultra-thick peeling veneers with thickness of 6 to 12 mm. Both surface board and back board are made of bamboo or wood. The core board comprises several layers of the ultra-thick veneers, and the veneers of contiguous layer are assembled with parallel structure. A glue layer is arranged between contiguous veneers; adhesive in the glue layer is aqueous macromolecule isocyanate adhesive. The ultra-thick veneers of the core layer are the veneers with stress degradation treatment, i.e., punctate or line segment cracks are formed along the grain of the veneer's loose side in each layer.

19 Claims, 3 Drawing Sheets

(56) References Cited

U.S. PATENT DOCUMENTS

2011/0274872 A1    11/2011    Yu et al.
2011/0293880 A1    12/2011    Yu et al.
2011/0293885 A1    12/2011    Yu et al.

FOREIGN PATENT DOCUMENTS

| | | |
|---|---|---|
| CN | 1995656 A | 7/2007 |
| CN | 200974273 Y | 11/2007 |
| CN | 201059051 Y | 5/2008 |
| CN | 101224590 A | 7/2008 |
| CN | 101524858 A | 9/2009 |
| CN | 101524859 A | 9/2009 |
| CN | 201353809 Y | 12/2009 |

OTHER PUBLICATIONS

Written Opinion for PCT/CN2009/075823 (English translation, six pages), mailed Apr. 1, 2010.
Int'l Preliminary Report on Patentability for PCT/CN2009/075823 (English translation, five pages), completed Mar. 22, 2011.

\* cited by examiner

ULTRA THICK BAMBOO-WOOD COMPOSITE PANEL, ULTRA THICK SOLID WOOD COMPOSITE PANEL AND MANUFACTURING METHODS THEREOF

This application is the U.S. national phase of International Application No. PCT/CN2009/075823, filed on 22 Dec. 2009, which designated the U.S., and claims priority to Chinese Application No. 200810240989.8, filed 24 Dec. 2008; Chinese Application No. 200810240988.3, filed 24 Dec. 2008; and Chinese Application No. 200920105908.3, filed 13 Feb. 2009. The entire contents of each of the foregoing are incorporated by reference herein.

FIELD OF THE INVENTION

The present invention relates to a wood-based composite panel and its manufacture. The present invention provides an ultra-thick bamboo/wood composite panel and a solid wood composite panel, and also provides a manufacturing method for the ultra-thick bamboo/wood composite panel and a solid wood composite panel.

BACKGROUND OF THE INVENTION

With the rapid development of wooden architecture in China, demand for structural timbers is greatly increased. According to the statistics issued by the Ministry of Housing and Urban-Rural Development, the gap between supply and demand of structural timbers in China was 40 million m³ in 2007. As the wooden structural construction continually develops, and with about 20 million m³ timbers for reconstruction in Sichuan due to the earthquake being taken into account, the gap between supply and demand of structural timbers in China is expected to reach 90 million m³ in 2010. According to the officials of the Canadian federal government, Canada has built about 300 units and plans to build another 9000 units of wooden structure houses in mainland China. It is estimated that about 15,000 units per year of the wooden structure houses will be built in China within the next five years, which brings enormous market potential for structural wood. If small-diameter plantation wood is made into solid wood composite panels or composited with bamboo so as to be made into ultra-thick composite panels by means of the technological breakthrough, in order to replace the large diameter high-quality wood, which is very important in alleviating the tense wood supply, and also brings a wider market prospect.

At present, solid wood composites panels mainly comprise such two categories of products as blackboard and multi-layer solid wood composite plywood. Blockboard is a kind of special plywood, and the manufacture comprises the following steps, firstly battens splice together to form core board, then a layer of veneer covers respectively on the upper and lower surface of the core board to form slab, last glue press is carried out on the slab. The core board is usually composed of spliced board or wood lattice structural panel, and the preparation is as follows, the log is sawed into battens with the width of 20 to 100 mm and thickness of 1 to 5 mm, then such strips are combined together to form the core board. Said method to prepare core board has such shortages as the large kerf losses while sawing the log, and the low wood utilization ratio. Based on the current situation that fast-growing plantation wood is dominated in commercial timbers of China, and the plantation wood usually contains the following defects, the small diameter class, the low density, the loose structure, the low strength, and so on. If plantation wood is directly sawed to be used as dimension lumbers, it will be with the following problems, the more scraps, and high unqualified ratio of dimension lumbers caused by knot, and juvenile wood, which will lead to the low utilization ratio. Additionally, because the wood strips which are combined together to form blockboard, are jointed by using glue joint in transverse, which lead to that the transverse MOR of the core board mainly depends on the joint strength of adhesive, so the blockboard usually can't meet the national standard because of the low transverse strength (see Zou Lin-lin, Lv Bin, Yang Na. The Analysis with the Development Status and Quality Problem of Block Board in China, Forestry Machinery & Woodworking Equipment, 2006, 34 (5):4-6).

Either from the view of the content and the scope of the research, or from the view of the depth of the research, the research level of bamboo/wood composite in China is in a world-leading position. According to incomplete statistics, in China, there are nearly thousand of various processing enterprises of bamboo-based panel and several dozens of products, the products are widely used in automobile compartment floor, container floor, construction of cement template, floor, decorative materials, furniture, and so on. (Zhang Ying-he, Thinking on the development of Bamboo-based Panel, Wood Processing Machinery, 2004). If small diameter wood is processed into veneers, and using the veneers alone or combined with bamboo so as to produce structural plywood or laminated veneer lumber, then the wood utilization ratio will be greatly increased.

In the existing technology, the multi-layer solid wood plywood or wood/bamboo composite plywood are produced as follows, the log, such as fast-growing plantation wood, is made into veneers with the thickness of 1 to 3 mm, the veneer is then used as core layer, and the plywood, laminated veneer lumber, or solid wood composites and bamboo/wood composites are produced after the following procedure, drying, gluing, assembling, hot pressing, and so on. The veneer used in such composite panels is thin, during the production of composite panels with the same thickness, the thinner veneer, the more glue layers are, and the adhesives used are more. As the adhesives used are generally thermosetting aldehyde adhesives, such as phenolic-aldehyde resin and urea-formaldehyde resin, and so on, thus more adhesives will cause the increase of the formaldehyde emission and the costs.

Figure 1:
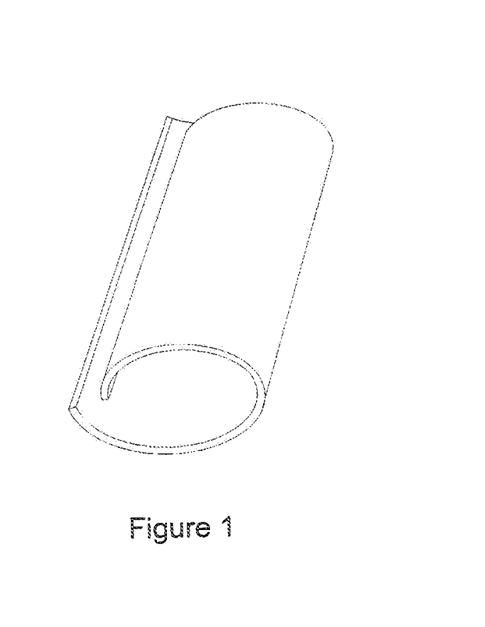
FIG. 1 is the warping and deformation diagram of 6 to 12 mm thick veneers without stress degradation.

The patent CN01133469.X has provided a multi-layer solid wood composite panel, wherein a 3-ply plywood is made of veneers with the thickness of 4 to 10 mm, and said plywood is used as core layer, the said composite panel is produced after sanding, and a surface layer overlaying the upper and lower surface of said core layer. Such composite panel made of thick veneers, can solve the problems caused by foregoing thin veneers and large amounts of glue used. However, it is difficult to peel veneers with the thickness more than 5 mm using traditional peeling equipment and it is mainly due to that, the veneer is originally circular arc in the wood segment, when wood is peeled into veneers, the veneers are level during peeling, and successively reverse bended. The result is that, compressive ($\sigma_1$) stress is produced on the surface of the veneer, and tensile ($\sigma_2$) stress is produced on the back of the veneer:

$$\sigma_1 = \frac{E \cdot S}{2\rho_1}, \sigma_2 = \frac{E \cdot S}{2\rho_2}$$

wherein, $\rho_1$ represents curvature radius of veneer in initial state (mm), $\rho_2$ represents curvature radius of veneer while reverse bending (mm), E represents elastic modulus along the grain of the wood (MPa), and S represents veneer thickness (mm) (see Wood-based Panel Technology, p 46, China Forestry Publishing House, Hua yu-kun). It can be seen from the formula that, the smaller the log diameter, the larger the thickness of the veneer, the greater the inner stress is, and it is easier to produce warping and deformation during the drying of the veneer (even bending and deformation are caused, as shown in FIG. 1). When the stress is larger than the transverse tensile or compressive strength, the veneer will crack, the above defects will seriously affect the wood outturn percentage and the subsequent processing procedures, such as glue spreading procedure and assembling procedure. Secondly, when veneer with such structure is used as core board, because of the excessive veneer stress, it is easy for the made composite panels to produce warping and deformation; moreover, the secondary overlaying process is used, the overlaying procedure is added.

Furthermore, hot-pressing forming method is generally used in the forming of the existing composite panels. Additionally, both bamboo and wood are poor conductors of heat, the difficulty of using hot-pressing to produce thick panels is greater, so the thickness of existing panels is generally smaller than 30 mm.

SUMMARY OF THE INVENTION

The object of the present invention is to improve the existing technology and provide an ultra-thick bamboo/wood composite panel. The glue amount used for the ultra-thick bamboo/wood composite panel is much less than that for the existing composite panels with the same thickness and the ultra-thick bamboo/wood composite panel has many advantages, such as no deformation, no warping, and so on.

Another object of the present invention is to provide a manufacturing method for said ultra-thick wood/bamboo composite panel.

Another object of the present invention is to provide an ultra-thick solid wood composite panel made of ultra-thick veneer, wherein the strength in each direction can meet national standard, it is not easy to deform or warp and convenient to process, and the lower adhesive amount can reduce the cost.

Another object of the present invention is to provide a manufacturing method for said ultra-thick solid wood composite panel.

To achieve the above objects, the present invention takes the following technical schemes.

The present invention provides an ultra-thick wood/bamboo composite panel, which comprises core board, surface board and back board. Said core board is composed of several ultra-thick peeling veneers with the thickness of 6 to 12 mm; both said surface board and said back board are made of bamboo. The veneers of contiguous layer in said core board are assembled with parallel structure or cross structure, said ultra-thick veneers which constitute said core board are the veneers with stress degradation treatment, and punctate or line segment cracks are formed in the direction along the grain of the loose sides of said veneers in each layer. A glue layer is arranged between contiguous said veneers.

For said cracks in the loose side of said veneer, the average length is in a range of 20 to 50 mm, and the average depth is from ¼ to ½ of the thickness of said veneer; or, the average length is in a range of 20 to 50 mm, the average depth is from ¼ to ½ of the thickness of said veneer, the average width is in a range of 0.2 to 3 mm, and the average distance between the cracks is in a range of 5 to 50 mm.

For said wood/bamboo composite panel, the total thickness is in a range of 45 to 90 mm.

In said wood/bamboo composite panel, the thickness ratio of the bamboo as surface board and back board to the wood is 1:10 to 2:1.

Said bamboo can be bamboo scrimber with the thickness of 5 to 20 mm, and can be also glued laminated bamboo with the same thickness.

For said glue layer between the lamellar in said ultra-thick wood/bamboo composite panel, the adhesive used is aqueous macromolecule isocyanate adhesive, and the glue spread amount is in a range of 80 to 300 $g/m^2$; or for said glue layer between the lamellar in said ultra-thick wood/bamboo composite panel, the adhesive used is resorcinol adhesive, and the glue spread amount is in a range of 150 to 300 $g/m^2$.

A manufacturing method for above ultra-thick wood/bamboo composite panel comprises raw material preparation procedure, glue spreading procedure, assembling procedure, forming procedure and maintenance procedure.

1. Raw material preparation procedure: the raw material preparation procedure includes such steps as the preparation of bamboo as surface board and back board, peeling of veneer and stress degradation treatment of veneer, and glue regulating. Wherein, said preparation of bamboo includes the preparation of bamboo scrimber and glued laminated bamboo.

1.1 The bamboo is processed into bamboo scrimber or glued laminated bamboo as surface board and back board, the technique is the existing technology.

1.2 The log is peeled into ultra-thick veneers with the thickness of 6 to 12 mm, punctate or line segment cracks are formed by stress degradation using stress degradation machine in the loose side of the veneer, after drying treatment, the moisture content of the veneers is in a range of 7% to 25%;

1.3 The adhesive used is aqueous macromolecule isocyanate adhesive, which is comprised of main agent and cross linking agent. The main agent is styrene-butadiene latex (SBR), vinyl acetate-ethylene copolymer emulsion (EVA) or polyacrylic acid emulsion. The cross linking agent is polymerized isocyanate (P-MDI), the amount of cross linking agent is from 5 to 20% of that of the main agent, after stirring uniformly, aqueous macromolecule isocyanate adhesive is formed.

If the adhesive used is resorcinol adhesive, such adhesive is comprised of main agent and curing agent. The main agent is linear resorcinol resin containing alcohol, and the alcohol content is between 1% and 5%. The curing agent is polyformaldehyde, and the mount of polyformaldehyde is 8 to 15% of that of main agent, after stirring uniformly, resorcinol adhesive is formed.

2. Glue Spreading Procedure

Aqueous macromolecule isocyanate adhesive or resorcinol adhesive is spread uniformly on the surface of the stress degraded veneer, and on the surface of bamboo scrimber or glued laminated bamboo. The glue spread amount is in a range of 80 to 300 $g/m^2$ for aqueous macromolecule isocyanate adhesive, and the glue spread amount is in a range of 150 to 300 $g/m^2$ for resorcinol adhesive.

3. Assembling Procedure

The bamboo scrimber or glued laminated bamboo, and the stress degraded veneer are assembled along the grain or with cross structure. Several said stress degraded veneers are combined together to form the core board, bamboo scrimber or glued laminated bamboo as surface board and back board are placed on the two sides of the core board, and then a slab is formed.

4. Forming Procedure

Said slab is sent to cold pressing machine to cold press, the cold pressing pressure is in a range of 1 to 5 MPa, the cold pressing time is in a range of 20 to 60 min, and the cold pressing temperature is room temperature.

The fifth procedure can be arranged after the forming procedure: maintenance procedure.

5. Maintenance Procedure

This is an alternative procedure.

Said slab is stacked in the oven at a temperature of 60 to 120° C. with a humidity of 60 to 98% to maintain, the maintenance time is in a range of 1 to 5 h, the maintenance pressure is in a range of 0.6 to 2 MPa.

The present invention provides a solid wood composite panel made of ultra-thick veneer, which comprises surface layer on the two outer surfaces and the core layer between the outer surfaces, and adhesive being arranged between the veneers in each layer.

Said core layer is composed of several ultra-thick veneers with the thickness of 6 to 12 mm; said surface layer is composed of veneers with the thickness of 0.2 to 1.5 mm.

The ultra-thick veneers used in core layer are the veneers by peeling logs, and punctate or line segment cracks are formed in the direction along the grain of the loose side of each veneer.

For the cracks in the loose side of ultra-thick veneer used in said core layer, the average length is in a range of 20 to 50 mm, the average depth is ⅙ to ½ of the thickness of the veneer; or, the average length is in a range of 20 to 50 min, the average depth is ⅙-½ of the thickness of the veneer; the average width is in a range of 0.2 to 3 mm, and the average distance is 5 to 50 mm between the cracks.

Further, said core layer is composed of even-ply of veneer, such as 2-ply, 4-ply, 6-ply, 8-ply, and so on. Said core layer is assembled with parallel structure or cross structure.

More specifically, wherein, the two veneers in the centre are the middle core board, the loose sides are jointed relatively, all the loose sides of the veneers in each layer outside of the middle core board are toward the middle core board, and assembled symmetrically. The grains are parallel to the middle core board of the central two layers, and the grains can be also arranged as vertical or interlaced to the middle core board of the central two layers.

Between said core layer and said surface layer, it can also comprise sub-surface layer. Sub-surface board is the sub-core board layer, namely balanced layer. The balanced layer is composed of veneers with the thickness of 1 to 3 mm, and the veneer of the sub-core board layer is arranged as vertical or interlaced to the wood grain of veneer in core layer and surface layer, the effect is to present the transverse warping of the core layer board.

Further, said core layer can be also composed of odd-ply of veneer, such as 3-ply, 5-ply, 7-ply, and so on. Said core layer is assembled using parallel structure or cross structure.

More specifically, wherein, one veneer in the centre is the middle core board, all the loose sides of the veneers in each layer outside of the middle core board are toward the middle core board, and the veneers are assembled symmetrically. The grains are parallel to the middle core board, and it can be also arranged as vertical or interlaced to the middle core board.

Sub-surface layer can be arranged on the outside of core layer. Sub-surface board is the sub-core board layer, namely balanced layer. Said balanced layer is made of veneers with the thickness of 1 to 3 mm, and the veneer of the sub-surface board is arranged as vertical or interlaced to the wood grain of veneer in core layer and surface layer.

The foregoing solid wood composite panel made of ultra-thick veneer, wherein, said core layer can be made by ultra-thick veneer with the thickness of 6 to 12 mm, and the ultra-thick veneer is made by the peeling of inferiority wood, such as poplar, Chinese fir, *cryptomeria, metasequoia,* spruce, and so on; said surface layer can be made by decorative overlay with the thickness of 02 to 1.5 mm, and the decorative overlay is made by the peeling of precious dicotyedonous wood, such as teak, *dalbergia hupeana,* keruing wood, and so on.

If said sub-surface layer is included, the veneer of said sub-surface layer can be made of common veneer with the thickness of 1 to 3 mm, and the common veneer is made by the peeling of plantation fast growing wood, such as poplar, birch, eucalypt, and so on.

The present invention provides a manufacturing method for solid wood composite panel made of ultra-thick veneer, comprises the steps as following.

A. Veneers Manufacture

The wood for making veneer in the core layer is peeling into ultra-thick veneers with the thickness of 6 to 12 mm, and said veneers are treated by the stress degradation machine, punctate or line segment cracks being formed along the grain in the loose sides of the veneers, then the veneers are used as veneers for core layer.

The wood for making surface layer veneer is peeled into veneers with the thickness of 0.2 to 1.5 mm, and then the veneers are used as decorative veneers for surface board.

B. Drying

The above veneers are dried until the moisture content is in a range of 8 to 15%.

C. Glue Spreading

The sizing is carried out on the ultra-thick veneer which is used in the core layer, and gluing is not used on the veneers which are used in surface layer.

D. Assembling

All the ultra-thick sizing veneers are assembled, and two thin veneers are assembled symmetrically on the upper and lower surface of the slab.

E. Hot-Pressing

The slab is hot pressed to become one flesh.

In the hot-pressing procedure, according to the type of the adhesive used, the corresponding hot-pressing temperature, hot-pressing pressure and hot-pressing time are set.

In the above process, if sub-surface layer is included, then in the veneers manufacturing procedure A, the wood for making the sub-surface layer is peeled into veneers with the thickness of 1 to 3 mm; in the drying procedure B, the veneers is also dried until the moisture content is in a range of 8 to 15%; in the glue spreading procedure C; the glue is spread for the veneers; and in the assembling procedure D, the veneer of the sub-surface layer is arranged between the core layer veneer and surface layer veneer with its wood grain vertical or interlaced to the wood grain of the core layer and the surface layer.

In the above process, the adhesive used can be one of the adhesives, such as urea-formaldehyde adhesive, melamine modified urea-formaldehyde adhesive, phenolic-aldehyde adhesive, isocyanate, and so on. If the adhesive is urea-formaldehyde adhesive or melamine modified urea-formaldehyde adhesive, then the glue spread amount is in a range of 150 to 300 g/m$^2$, the hot-pressing time is in a range of 0.5 to 1.6 min/mm, the hot-pressing temperature is in a range of 120 to 160° C., and the hot-pressing pressure is in a range of 0.7 to 2 MPa. If the adhesive used is a phenolic-aldehyde adhesive, then the glue spread amount is in a range of 150 to 300 g/m$^2$, the hot-pressing time is in a range of 0.5 to 2.0 min/mm, the hot-pressing temperature is in a range of 130 to 180° C., and the hot-pressing pressure is in a range of 0.7 to 2.0 MPa. If the adhesive used is isocyanate, then the glue spread amount is in a range of 20 to 50 g/m², the hot-pressing time is in a range of 0.5 to 1.2 min/mm, the hot-pressing temperature is in a range of 90 to 130° C., and the hot-pressing pressure is in a range of 0.7 to 2.0 MPa.

In the assembling procedure, in the core layer composed of multilayer ultra-thick veneers, the two veneers or one veneer arranged in the center is the middle core board. If the above two veneers are the middle core board, then the loose sides of the two veneers are jointed relatively. The loose sides of the veneers in each layer outside of the middle core board can be toward the middle core board, and assembled symmetrically, and the grains can be parallel to the middle core board. The grains can be also vertical or interlaced to the middle core board, the loose sides are toward the middle core board, and assembled symmetrically.

The ultra-thick wood/bamboo composite panels and solid wood composite panels provided in the present invention, are made of ultra-thick veneers with the thickness of 6 to 12 mm, said ultra-thick veneer is made by plantation fast-growing wood peeling into by peeling technology, and then said ultra-thick veneer is treated by stress degradation technology, punctate or line segment cracks are formed in the veneer loose side. It has obvious advantages with stress degradation treatment, such as, firstly, after stress release treatment, the transverse stress of the ultra-thick veneers is weakened, therefore, the problems such as warping, deformation, and so on, can be avoided; Secondly, after stress release treatment, the surface stress can be released, then the loss caused by veneer broken in the subsequent procedures, such as drying, glue spreading procedure, assembling procedure, and so on, can be lowered, thus the wood utilization ratio can be enhanced; lastly, after stress release treatment, punctate or line segment cracks formed in the surface of the veneer, which can increase the specific surface area, and reduce the resistance that the water is discharged from wood, thus can increase the veneer drying rate, i.e. reduce the energy consumption in veneer drying. Thereby, it can make ultra-thick wood/bamboo composite panels and solid wood composite panels with reduced glue layers by plantation forest fast-growing wood. Since the core boards of said ultra-thick wood/bamboo composite panel and said solid wood composite panel are ultra-thick veneers, the glue spread amount are greatly decreased compared with common composite panels; the cracks made by specially stress degradation treatment in the veneer can solve the problems of the thick veneers, such as warping, deformation, cracking, and so on. By the use of ultra-thick veneer, the choose of adhesive type and special design of glue spread amount, the aqueous macromolecule isocyanate adhesive or resorcinol adhesive with high cost can be applied to the ultra-thick wood/bamboo composite panel; and because aqueous macromolecule isocyanate adhesive or resorcinol adhesive are used, the composite panels can be cured and formed by cold pressing, which can resolve the problems that, it is different to produce ultra-thick by hot-pressing method due to the poor heat conductivity; thus the ultra-thick wood/bamboo composite panels and ultra-thick solid composite panel can be made.

In the present invention, ultra-thick veneers with the thickness of 6 to 12 mm are used, when compared with common veneers with the thickness of 1 to 3 mm, it has another obvious advantage: compared with the common multi layer solid wood composite plywood, the solid wood composite panel made of ultra-thick veneers is more like solid wood; compared with blackboard, the kerf loss when the logs are sawed into solid battens can be reduced, the wood utilization ratio can be enhanced, meanwhile, peeling technology is used, so the production efficiency can be enhanced.

The following that, 1.5 mm, 3 mm, 6 mm or 9 mm thick veneers using as core layer and 1 mm thick veneers using as surface and back layers respectively, being used to make into solid wood composite panels with the target thickness of 18 mm, is to illustrate the relationship between veneer thickness and glue spread amount. It can be seen from Table 1 that, with the increase of the veneer thickness, the glue spread amount decrease; as the same production of 18 mm thick panel, if 6 mm thick veneer is used, the total glue spread amount is just 21.05% of that when 1.5 mm thick veneer used; and if 9 mm thick veneer is used, the glue spread amount is just 15.79% of that when 1.5 mm thick veneer is used. The reduction of the glue spread amount greatly lower the panels production cost.

Table 1 the relationship between veneer thickness and glue spread amount

| Veneer thickness (mm) | 1.5 | 3 | 6 | 9 |
|---|---|---|---|---|
| Compression ratio (%) | 10% | 10% | 10% | 10% |
| Target thickness of panels (mm) | 18 | 18 | 18 | 18 |
| The veneer number of core layer (piece) | 18 | 6 | 3 | 2 |
| Glue layer number (layer) | 19 | 7 | 4 | 3 |
| Glue spread amount of each glue layer (g/m²) | 200 | 200 | 200 | 200 |
| Total glue spread amount (g) | 3800 | 1400 | 800 | 600 |

The following combined with accompanying drawings and specific examples, further to describe the present invention, but not do any limitation to the present invention. Any equivalent replacement in this filed according to the disclosure of the invention belongs to the protection scope of the invention.

DETAILED DESCRIPTION OF THE DRAWINGS

FIG. 6 is the diagram for odd-ply solid wood composite panel made of ultra-thick veneers In above drawings, the appended drawing reference sign 1 stands for punctate or line segments cracks on the ultra-thick veneer made by stress degradation; the appended drawing reference sign 2 stands for glued laminated bamboo; the appended drawing reference sign 3 stands for veneer with thickness of 6 to 12 mm assembled along the grain; the appended drawing reference sign 4 stands for bamboo scrimber; the appended drawing reference sign 5 stands for ultra-thick veneer with thickness of 6 to 12 mm assembled along the grain; the appended drawing reference sign 6 stands for ultra-thick core board with the grain with thickness of 6 to 12 mm veneer 3 assembled along the grain; the appended drawing reference sign 4' stands for upper surface board and the appended drawing reference sign 5' stands for lower surface board; the appended drawing reference sign 7 and 8 stand for transverse grain ultra-thick core board of core layer; the appended drawing reference sign 9 stands for upper surface board and 10 stands for lower surface board.

EMBODIMENT

Figure 2:
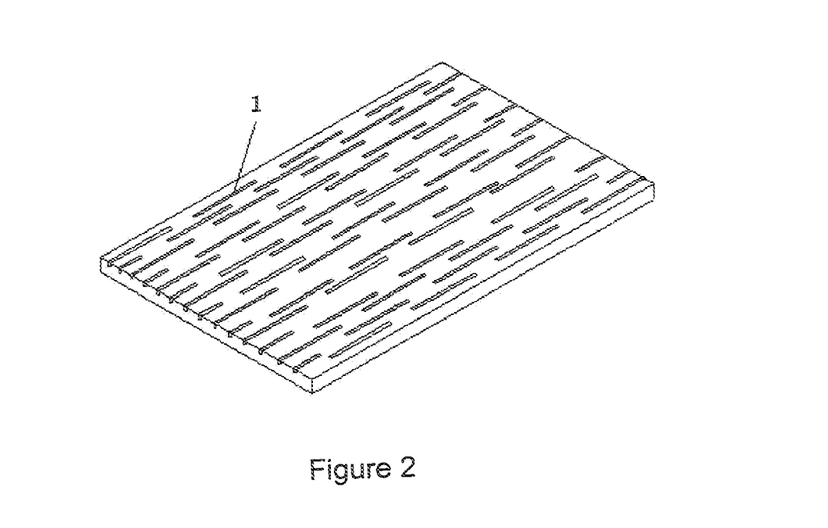
FIG. 2 is the diagram of 6 to 12 mm thick veneers after stress degradation
Figure 3:
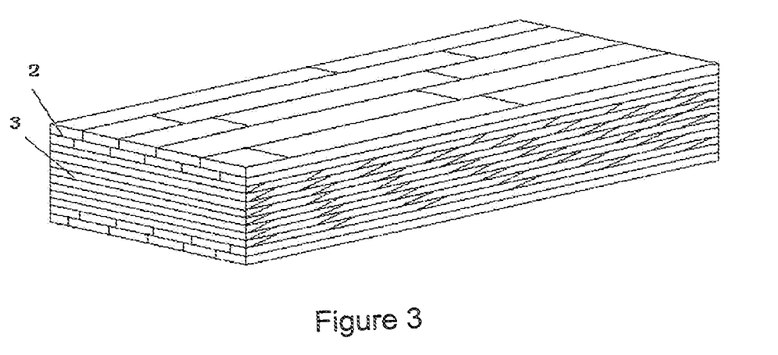
FIG. 3 is the diagram of ultra-thick glued laminated bamboo and poplar composite panel assembled with parallel grain plies.
Figure 4:
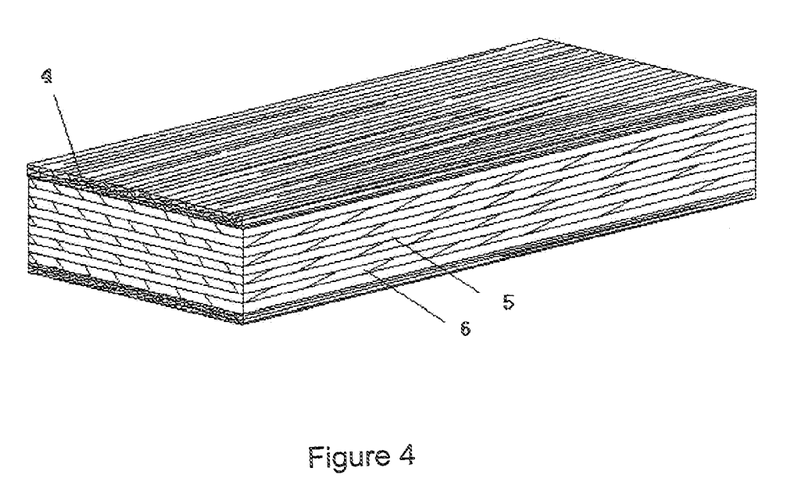
FIG. 4 is the diagram of ultra-thick bamboo scrimber and eucalypt composite panel assembled with cross-banded plies.

Ultra-thick wood/bamboo composite panel according to the present invention comprises core board, surface board and back board. Said core board is composed of several ultra-thick peeling veneers with the thickness of 6 to 12 mm; said surface board and back board are made of bamboo. Said core board includes several layers of said ultra-thick veneers, and the veneers of contiguous layer are combined parallel the grain (as shown in FIG. 3) or with cross structure (as shown in FIG. 4); glue layer is arranged between contiguous said veneers. Said ultra-thick veneer of said core board is a veneer after stress degradation treatment (as shown in FIG. 2), namely, punctate or line segment cracks are formed in the direction along the grain of the loose side of said veneer in each layer; the adhesive of said glue layer is aqueous macromolecule isocyanate adhesive or resorcinol adhesive.

The average length of said cracks in loose side of said veneer is in a range of 20 to 50 mm, the average depth is from ¼ to ½ of said veneer thickness.

Further, the average width is in a range of 0.2 to 3 mm, the average distance between cracks is in a range of 5 to 50 mm. With such width and distance of the cracks, the stress degradation effect can be better.

If the length of the cracks after stress degradation is shorter, the depth is shallower, or much sparser, it will not reduce the elastic modulus of the ultra-thick veneer in the direction along the grain. It can be known according to stress formula of the veneer that, the stress could not be fully released in the subsequent process such as drying and glue spreading process, and the ultra-thick veneer will produce warping and deformation; however, if the degradation extent of the cracks is too large, it will directly cause the tearing of the veneer and the increase of the veneer surface roughness in the degradation process; thus, it will damage the mechanical properties and increase the glue spread, then bring the performance reduction of the composite board.

For said ultra-thick wood/bamboo composite panels, the total thickness is in a range of 45 to 90 mm.

In said ultra-thick wood/bamboo composite panel, the thickness ratio of the bamboo as face layer and back layer to the wood as core board is 1:10 to 2:1.

Said bamboo can be bamboo scrimber with the thickness of 5 to 20 mm, or can also be glued laminated bamboo with the same thickness.

The adhesive of said glue layer arranged between the lamellar in said ultra-thick wood/bamboo composite panel is aqueous macromolecule isocyanate adhesive; the glue spread is in a range of 80 to 300 g/m$^2$; or, the adhesive of said glue layer arranged between the lamellar in said ultra-thick wood/bamboo composite panel is resorcinol adhesive; the glue spread is in a range of 150 to 300 g/m$^2$.

The manufacture process for above ultra-thick wood/bamboo composite panel, comprises raw material preparation procedure, glue spreading procedure, assembling procedure, forming procedure and maintenance procedure.

1. Raw Material Preparation Procedure

The raw material preparation procedure includes preparation of bamboo based panel, peeling of veneer and stress degradation treatment, and glue regulating, wherein, said preparation of bamboo based panel includes preparation of bamboo scrimber and glued laminated bamboo.

1.1 The bamboos are made into bamboo scrimber or glued laminated bamboo as surface board and back board.

1.2 The log is peeled into ultra-thick veneers with the thickness of 6 to 12 mm, punctate or line segment cracks are formed by stress degradation using stress degradation machine in the loose side of the veneer, after drying treatment, the moisture content of the veneer reaches a range of 7 to 25%, then the veneer is used as the core board;

1.3 The adhesive can be as the two following kinds:

a. Aqueous macromolecule isocyanate adhesive, being composed of main agent and cross linking agent, main agent is styrene-butadiene (SBR) latex, vinyl acetate-ethylene copolymer emulsion (EVA) or polyacrylic acid emulsion, cross linking agent is polymerized isocyanate (P-MDI), the amount of cross linking agent is from 5 to 20% of that of the main agent, after stirring uniformly at room temperature, aqueous macromolecule isocyanate adhesive is formed.

b. Resorcinol adhesive, being composed of main agent and curing agent, main agent is linear resorcinol resin containing alcohol, curing agent is polyformaldehyde, the mount of polyformaldehyde is 8 to 15% of that of main agent, after stirring uniformly at room temperature, resorcinol adhesive is formed.

2. Glue Spreading Procedure

Aqueous macromolecule isocyanate adhesive or resorcinol adhesive is spread uniformly on the surface of the stress degraded veneer and on the surface of bamboo scrimber or glued laminated bamboo.

The glue spread amount in each glue layer is from 80 to 300 g/m$^2$ for aqueous macromolecule isocyanate adhesive, and the glue spread amount in each glue layer is from 150 to 300 g/m$^2$ for resorcinol adhesive.

3. Assembling Procedure

The bamboo scrimber or glued laminated bamboo and the veneer by stress degradation are assembled parallel or cross structure. The bamboo scrimber or glued laminated bamboo is used as surface board and back board, and the stress degraded veneer is used as core board.

4. Forming Procedure

The above assembled slab is sent into cold pressing machine to cold press, the cold pressing pressure is in a range of 1 to 5 MPa, the cold pressing time is a range of 20 to 60 min, and the cold pressing temperature is room temperature.

The fifth procedure can be arranged after the forming procedure: maintenance procedure.

5. Maintenance Procedure

This is an alternative procedure. The above slab is stacked in the oven at a temperature of 60 to 120° C. with a humidity of 60 to 98%, the maintenance time is in a range of 1 to 5 h, and the maintenance pressure is in a range of 0.6 to 2 MPa.

In the present invention, special bamboo/wood composite board structure is used, whose elementary composed units is bamboo/wood unit composed of bamboo and ultra-thick veneer with the thickness of 6 to 12 mm. The bamboo with high strength, large surface hardness and special texture is assembled on the surface layers, the ultra-thick veneer made by the peeling of wood and with defects, such as low density, low strength, knots, and so on, is assembled in the core layer. It not only exerts the advantages of bamboo, such as high strength, decoration effect, and so on, but also exerts the advantages of plantation timbers, such as high utilization ratio and production.

As the prices of the bamboo is increasing, and the bamboo has the following defects, such as low utilization ratio, low production efficiency, and so on, compared with common bamboo LVL, bamboo/wood composite panel can enhance the production efficiency and reduce production cost. Additionally, the density of plantation forest fast-growing wood is lower than that of bamboo, using the bamboo/wood composite structure can lower the density of the panels, thus reduced the weight of panel itself.

The large-diameter timbers is reducing, and the LVL of China is currently made by plantation timbers, but plantation wood universally has defects, such as loose tissue, low strength, more knots, big growth stress, and so on, so the LVL made of such wood is generally difficult to meet the performance index of structural material. Compared with common LVL, the bamboo/wood composite panel can fully exert the high strength and hardness of bamboo, and enhance the physical and mechanical properties of the panel, so as to meet the requirements of structural materials performance index.

Compared with the dimension lumbers, the panels in this invention have obvious advantages, the use of peeling method, the reduction of the kerf losses, thus the improvement of the wood utilization ratio.

The ultra-thick bamboo/wood composite panels provided in the present invention can not only be used for architectural structural materials such as beams, columns, barriers, and so on, so as to replace the solid wood dimension lumbers, but also can be used as decorative materials for furniture, doors, windows, and so on.

The traditional bamboo/wood composite materials are generally made by hot pressing. Due to the temperature gradient between the core and surface layers, especially in thick panels, such contradiction exists that, surface layer becoming discolor even carbonization due to the high temperature, while the glue in the core layer has not yet fully cured. The panel is thicker, and the contradiction is more outstanding. Then the discoloration and degradation of surface board will affect the decorative effect and mechanical strength, and the adhesive in the core layer has not fully cured due to the low temperature, it can fall short of adhesion effect, thus affect the gluing strength of the panel, However, in the present invention, the aqueous macromolecule isocyanate adhesive and resorcinol adhesive are belong to the adhesives that can be cured at normal temperature, so when such adhesives is used to produce the bamboo/wood composite panels, ambient curing can be used. So, in this present invention, a cold-pressing method is used. And the advantages of said ambient curing are as follows: the reduction of the energy consumption of hot pressing in hot pressing process, the elimination of discoloration and carbonization of the surface board caused by hot, the keep of board natural color; meanwhile, the elimination of the temperature gradient between the core and surface boards, the improvement of the property stability of the panel, and the fully curing of the adhesive used in the core layer of the ultra-thick panel.

When the composite panel with the same thickness is made, compared with the common veneers with the thickness of 1 to 3 mm, using ultra-thick veneers with 6 to 12 mm in the present invention, can reduce the number of glue layers and glue spread, and therefore reduce the cost. It is due to the reduction of the number of glue layers and glue spread that, aqueous macromolecule isocyanate adhesive and resorcinol adhesive with high-cost can be applied in the ultra-thick bamboo/wood composite panel, and then the gluing quality is enhanced. The following is an example of the manufacture of the 45 mm thick bamboo/wood composite boards, the relationship between veneer thickness and glue spread can be illustrated by table 1.

Table 1 the relationship between veneer thickness and glue spread amount

| Veneer thickness (mm) | 1.5 | 3 | 6 | 9 | 11 |
|---|---|---|---|---|---|
| Compression ratio (%) | 16.66% | 16.66% | 16.66% | 16.66% | 18.18% |
| Panels target thickness (mm) | 45 | 45 | 45 | 45 | 45 |
| The veneer number (piece) | 36 | 18 | 9 | 6 | 5 |
| Glue layer number (layer) | 35 | 17 | 8 | 5 | 4 |
| Glue spread amount of each glue layer (g/m²) | 200 | 200 | 200 | 200 | 200 |
| Total glue spread amount (g) | 7000 | 3400 | 1600 | 1000 | 800 |

It can be seen from Table 1 that, with the increase of the veneer thickness, the glue spread amount decrease; with the production of 45 mm thick board, if 6 mm thick veneers is used, the total glue spread amount is just 22.85% of that when 1.5 mm thick veneers are used, and if 11 mm thick veneers is used, the total glue spread amount is just 11.43% of that when 1.5 mm thick veneers are used. The reduction of glue spread amount can greatly lower the panels production cost.

In the present invention, aqueous macromolecule isocyanate adhesive is used, compared with the phenolic-aldehyde resins or urea-formaldehyde resins adhesive which is used in the common bamboo/wood composites board, it has following advantages. Firstly, aqueous macromolecule isocyanate adhesive is a non-aldehyde adhesive, formaldehyde emission of the panels produced by aqueous macromolecule isocyanate adhesive is the same as that of the base material, i.e. bamboo and wood. Secondly, the color of cured aqueous macromolecule isocyanate adhesive is light yellow or milky white, which is similar to the color of bamboo and wood, compared with the red-brown of cured phenolic-aldehyde resin adhesive, it will be more like solid wood. Moreover, aqueous macromolecule isocyanate adhesive belongs to the adhesives that can be cured at room temperature, so ambient curing can be used.

In the present invention, ultra-thick veneers are treated with stress degradation, compared with the untreated veneers, after stress degradation, punctate or line segmented cracks are formed in the grain direction on the loose side of veneers, which have the following advantages. Firstly, according to the compressive ($\sigma_1$) stress formula on the surface of the veneer, and tensile ($\sigma_2$) stress formula on the back of the veneer:

$$\sigma_1 = \frac{E \cdot S}{2\rho_1}, \sigma_2 = \frac{E \cdot S}{2\rho_2}$$

Wherein, $\rho_1$ represents curvature radius of veneer in initial state (mm), $\rho_2$ represents curvature radius of veneer while reverse bending (mm), E represents elastic modulus along the grain of the wood (MPa), and S represents veneer thickness (mm) (Wood-based Panel Technology, p 46, China Forestry Publishing House, Hua Yu-kun). After stress degradation treatment, the transverse elastic modulus of the ultra-thick veneer can be weakened, the compressive ($\sigma_1$) stress on the surface of the veneer and the tensile ($\sigma_2$) stress on the back are reduced, and therefore, the warping and deformation of the veneer can be avoided. Secondly, after stress degradation treatment, the internal stress of veneers can be released, then the loss caused by veneer broken in the subsequent procedures can be lowered, such as drying, glue spreading procedure, assembling procedure, and so on, thus the wood utilization ratio can be enhanced. Moreover, after stress degradation treatment, the punctate or line segment cracks formed in the surface of the veneer, which can increase the specific surface area, and reduce the resistance when the water is discharged from wood, thus can increase the veneer drying rate, and reduce the energy consumption during drying the veneer.

In the present invention, the pressing-temperature-humidity combined maintenance method is used; the maintenance is carried out under the environment with the a temperature of 60 to 120° C. and humidity of 60 to 98%. The maintenance method has obvious advantages, the aqueous macromolecule isocyanate adhesive or resorcinol adhesive can be fully cured under humidity-temperature treatment, further enhance the physical and mechanical properties, more further release the stress existing in the said veneers, then improve the dimensional stability of veneers.

Example 1

Manufacturing of bamboo laminated veneer lumber is a known technology (Zhao Ren-jie, Liu Yun-shui, bamboo-based Panel Technology, China Forestry Publishing House, 2002). The bamboo is saw into bamboo segments with the length of 2500 mm by saw cutting machine; then the said bamboo segments is split into bamboo strips with width of 20 mm by bamboo splitting machine; then bamboo outer skin and bamboo inner skin on the surface of the said bamboo strips are planed by rough planing machine; the said planed bamboo strips are digesting and with mildewproof and corrosion protection treatment; said rough planed bamboo strips are dried until the moisture content is in a range of 7 to 9%; the dried bamboo strips are precision planed by precision planing machine, the precision of the thickness is kept about ±0.2 mm. Aqueous macromolecular isocyanate adhesive is spread on the side and surface of said bamboo strips; said sizing bamboo strips are assembled along the grain and pieced in transverse as the designed width and thickness using the press machine with 2.0 MPa positive pressure and 0.2 MPa lateral pressure; the glued laminated bamboo are made with the thickness of 5 mm, 6 mm, 7.5 mm, 10 mm, 15 mm, 20 mm, the length of 2500 mm, and the width of 1300 mm.

Using the spindle-less peeling machine described in patent ZL00106076.7, the poplar logs are peeled into ultra-thick veneers with the thickness of 8 mm, 9 mm and 10 mm, the length of 2500 mm, and the width of 1300 mm. Using the stress degradation machine described in patent ZL01280006.6, stress degradation treatment is carried on said veneers, to make the veneers being the veneers with punctate and line segment cracks formed along the longitudinal grain of the loose side in the veneer, the average length of said cracks in the loose sides of above veneers is about 30 mm, the average thickness is ¼ of the veneer thickness, the average width is 1 mm, the average distance between the cracks is 10 mm (as showed in FIG. 2).

Said spindle-less peeling machine uses universal transmission shaft as driving mechanism, and the two universal joints are concentric turning. The friction axis is composed of a roller with tightening nut on its ends, a number of ball bearings, and bearings supported by roller bearings at both ends. When all the bearings, roller body and spacers are installed on the bearing in turn, tightening the tightening nut at both ends of the bearing to make them closely integrated to ensure that the friction axis is a linear axis. Through the implement of above two key technologies, as the peeling accuracy is increased, the friction between wood and friction roller is reduced, and the resistance of peeling is reduced, then the purpose of peeling small-diameter plantation fast-growing wood into ultra-thick veneer is achieved. The peeling process is the same to the existing ordinary peeling process without spindle.

Said veneer stress degradation machine is combined by active rotary feed friction roller shafting and the profiled stacked gear shafting. The friction roller and stress degradation roller are used as active roller and driven roller, respectively. The transverse stress of wood is degraded by splitting, without breaking the wood longitudinal strength; the object of wood stress degradation is completed. The stress degradation process is that, the loose surface and tight surface are located towards the stress degradation roller and friction roller, and the distance between them is adjusted according to the degradation degree, after degradation, the stress degradation is completed.

The above mentioned veneer is dried in the drying machine until the moisture content is in a range of 7 to 25%.

Said aqueous macromolecule isocyanate adhesive is composed of main agent and cross linking agent, the amount of the cross linking agent is 5 to 20% of that of the main agent, after stirring uniformly, aqueous macromolecule isocyanate adhesive is formed.

Said main agent of the aqueous macromolecule isocyanate adhesive is styrene-butadiene latex (SBR), vinyl acetate-ethylene copolymer emulsion (EVA) or polyacrylic acid emulsion.

Said cross linking agent of the aqueous macromolecule isocyanate adhesive is polymer isocyanate (P-MDI);

Said aqueous macromolecule isocyanate adhesive is uniformly spread on the surfaces of said ultra-thick stress degraded veneer, and on the surfaces of bamboo scrimber or glued laminated bamboo, the spread amount of each glue layer is in a range of 80 to 300 g/m$^2$.

If aqueous macromolecule isocyanate adhesive is used, the ratio of main agent and cross linking agent can be as follows, when the amount of cross linking agent is 5% of that of main agent, the corresponding glue spread amount for each layer is 200 g/m$^2$; when the amount of cross linking agent is 20% of that of main agent, the corresponding glue spread amount for each layer is 100 g/m$^2$; when the amount of cross linking agent is 12% of that of main agent, the corresponding glue spread amount for each layer is 150 g/m$^2$.

If resorcinol adhesive is used, the ratio of main agent and curing agent can be as follows, when the amount of curing agent (polyformaldehyde) is 10% of that of main agent, the corresponding glue spread amount for each layer is 270 g/m$^2$; when the amount of said curing agent is 15% of that of main agent, the corresponding glue spread amount for each layer is 160 g/m$^2$; when the amount of said cross linking agent is 12% of that of main agent, the corresponding glue spread amount for each layer is 230 g/m$^2$.

The sizing glued laminated bamboo is paved on the upper and lower surface along the grain, and several sizing stress degraded veneers are assembled in the core layer along the grain (see FIG. 3).

The above assembled slab is sent to cold pressing machine to cold press, and the cold pressing pressure is in a range of 1 to 5 MPa, such as, specifically, the cold pressing pressure can be 1.5 MPa, 5.0 MPa or 3.0 MPa; the cold pressing time is in a range of 20 to 60 min, for example, at room temperature, the pressing time is 55 min corresponding to the 1.5 MPa pressure, the pressing time is 23 min corresponding to the 5 Mpa pressure, and the pressing time is 45 min corresponding to the 3 MPa pressure.

After the above slabs is taken out, it should be stacked immediately, and a pressure of 1 to 2 MPa is applied on the surface of each stocking, the stocking time is in a range of 1 to 5 days. The purpose is to make the adhesive without completely curing to continue curing, and the stress formed by compression in the interior of the slab to be further degraded.

The poplar log is peeled into ultra-thick poplar veneers with thickness of 8 mm, 9 mm and 10 mm, then said ultra-thick poplar veneers are composite with said glued laminated bamboo with thickness of 6 to 12 mm; the glue spread amount is 200 g/m$^2$. As the following bamboo/wood composite ratio showed in Table 2, the ultra-thick bamboo/poplar composite panels are pressed, and the physical and mechanical properties of the ultra-thick wood/bamboo composite panels are also showed in Table 2.

Table 2 the performance comparison of bamboo/poplar composite panels (BPCP) in different ratios of bamboo to wood

| Raw materials | bamboo LVL thickness/ mm | veneer thickness/ mm | Poplar veneer layers/ layer | Bamboo/ wood % | Density g/cm³ | MOE MPa | MOR MPa | Shear strength of glue layers MPa | |
|---|---|---|---|---|---|---|---|---|---|
| | | | | | | | | Bamboo/ wood | Wood/ wood |
| Poplar LVL | | 10 | 6 | | 0.45 | 8900 | 64.9 | — | 7.23 |
| BPCP | 5 | 10 | 5 | 1:5 | 0.51 | 9297 | 82.5 | 8.23 | 7.25 |
| BPCP | 6 | 8 | 6 | 1:4 | 0.56 | 9534 | 91.8 | 8.43 | 7.29 |
| BPCP | 7.5 | 9 | 5 | 1:3 | 0.59 | 9615 | 97.9 | 8.45 | 7.39 |
| BPCP | 10 | 8 | 5 | 1:2 | 0.63 | 10074 | 103.4 | 8.34 | 7.33 |
| BPCP | 15 | 10 | 3 | 1:1 | 0.71 | 10380 | 109.6 | 8.53 | 7.23 |
| BPCP | 20 | 10 | 2 | 2:1 | 0.78 | 10540 | 112.4 | 8.34 | 7.32 |
| Bamboo LVL | — | — | — | — | 0.8 | 10562 | 120 | 9.6 | — |

Note:
the thickness of slab is 60 mm, the compression ratio is 16.66%, and the thickness of products is 50 mm.

It can be seen from table 2 that, with the increase of the ratio of bamboo to wood, the density increases, and MOR of panels increase; as the ratio of bamboo to wood is 1:5, the MOR is increased by 27.18% than that of the poplar LVL; as the ratio of bamboo to wood continues to increase, the increase rate of MOR of the panels slows down. It can be also seen from table 2 that, with the increase of the ratio of bamboo to wood, the elastic modulus and shear strength of the panels are increased slightly, but the increase magnitude is little. The shear strength between bamboo layer and wood layer is more than that between wood layers, it is because that, the penetrability of adhesive in wood is better than that in bamboo, the adhesive between bamboo layer and wood layer mainly penetrates to wood interface, a enhancement layer is formed at the gluing interface of the wood.

Example 2

Manufacture technology of bamboo scrimber is a known technology, (Zhao Ren-jie, Liu Yun-shui, bamboo-based Panel Technology, China Forestry Publishing House, 2002). It is divided into cold-pressing and oven-drying method and hot pressing method, wherein in the cold-pressing and oven-drying method, the bamboo is manufactured to bamboo filaments or bundles, by dipping glue, drying, moulding, cold pressing and oven-drying, then bamboo scrimber is made; in the hot pressing method, the bamboo is manufactured to bamboo filaments or bundles, by dipping glue, drying, pavement, hot pressing, then bamboo scrimber is formed; the above bamboo scrimber is processed into bamboo scrimber veneers with the thickness of 5 mm, 6 mm, 7.5 mm, 10 mm, or 15 mm, the width of 50 mm and the length of 4000 mm by sawing, splicing and finger jointing. The peeling, degradation and glue spreading procedure of Chinese fir are the same as in Example 1.

The above sizing bamboo scrimber veneers and ultra-thick veneers of Chinese fir, are assembled in the mould described in ZL200720141772.2, as the bamboo scrimber being paved on the upper and lower surface and Chinese fir ultra-thick veneers being assembled in the core layer, and the pressure is 5 MPa; then pressing until the prescriptive thickness, the pin is plugged. The above mould and the bamboo/wood composite slabs are sent into the maintenance room, the above slabs are stocked in the oven, the maintenance is carried out with the temperature of 60 to 120° C. and the humidity of 60% to 98%, the time is in a range of 1 to 5 h.

Table 3 the main physical and mechanical properties of bamboo/Chinese fir composite panels (BCFCP) with different ratio of bamboo to wood

| Raw materials | Bamboo scrimber thickness mm | Veneer thickness mm | Poplar veneer layers/ layer | Bamboo to wood ratio/% | Density g/cm³ | MOE/ MPa | MOR/ MPa | Shear strength of glue layers/MPa | |
|---|---|---|---|---|---|---|---|---|---|
| | | | | | | | | Bamboo/ wood | Wood/ wood |
| Chinese fir LVL | | 10 | 6 | | 0.4 | 5453 | 54.7 | — | 4.23 |
| BCFCP | 5 | 10 | 5 | 1:5 | 0.48 | 10897 | 83.9 | 5.54 | 4.45 |
| BCFCP | 6 | 8 | 6 | 1:4 | 0.61 | 11234 | 89.8 | 5.45 | 4.84 |
| BCFCP | 7.5 | 9 | 5 | 1:3 | 0.66 | 12086 | 90.8 | 5.57 | 4.37 |
| BCFCP | 10 | 8 | 5 | 1:2 | 0.76 | 12217 | 95.5 | 5.84 | 4.53 |
| BCFCP | 15 | 10 | 3 | 1:1 | 0.95 | 14328 | 127.4 | 5.33 | 4.56 |
| BCFCP | 20 | 10 | 2 | 2:1 | 1.15 | 14123 | 130.5 | 5.36 | 4.32 |
| Reconsolidated-bamboo | — | — | — | — | 1.3 | 15321 | 139.7 | 9.6 | — |

Note:
the thickness of slab is 60 mm, compression ratio is 16.66% and the thickness of products is 50 mm.

It can be seen from Table 3, with the increase of the ratio of bamboo to wood, the MOE and MOR of panels increase. The density of composite panels is lower than that of bamboo scrimber, so the weight of composite panels itself is greatly reduced.

Example 3

The manufacture process of glued laminated bamboo and bamboo scrimber are as described in Example 1 and Example 2, and the bamboo is sawed into veneers with the thickness of 8 mm.

The peeling and stress degradation of eucalyptus veneer are the same as in Example 1. The thickness of veneer is 8 mm.

The resorcinol adhesive is composed of main agent and curing agent, wherein, the amount of said polyformaldehyde is 8 to 15% of that of main agent, after stirring uniformly, resorcinol adhesive is formed.

Said main agent is linear resorcinol resin liquid containing alcohol, said curing agent is polyformaldehyde, the amount of said polyformaldehyde is 8 to 15% of that of main agent, after stirring uniformly, resorcinol adhesive is formed.

The resorcinol adhesive is spread uniformly on the surface of stress degraded wood veneers and on the surface of bamboo scrimber or glued laminated bamboo; the glue spread amount in each glue layer is in a range of 150 to 300 g/m$^2$.

The sizing bamboo scrimber or glued laminated bamboo are assembled on the upper and lower surface along the grain, and sizing 9-ply eucalyptus veneers are assembled in the core layer with cross structure.

The above assembled slab is sent to cold pressing machine to cold press, and the cold pressing pressure is in a range of 1 to 5 MPa, the cold pressing time is in a range of 20 to 60 min, the temperature is room temperature.

After the above slabs is taken out, it should be stacked immediately, and a pressure of 1 to 2 MPa is applied on the surface of each stocking, the stocking time is in a range of 1 to 5 days. The purpose is to make the adhesive without completely curing to continue curing, and the stress formed by compression in the interior of the slab to be further degraded.

Table 4 the main physical and mechanical properties of bamboo/eucalyptus composite panels with cross-banded plies The solid wood composite panels made of ultra-thick veneers provided in present invention, is composed of even-ply veneers, comprising the surface layers of the two outer surfaces, and the core layer is assembled between the outer surfaces, adhesive being between the veneers in each layer.

Said core layer can be composed of even-ply of veneers, such as 2-ply, 4-ply, 6-ply, 8-ply, and so on. Said core layer is assembled using parallel structure or cross structure; wherein, the two veneers in the centre are the middle core board, the loose sides are jointed relatively, all the loose sides of the veneers in each layer outside of the middle core board are toward the middle core board, and the veneers are assembled symmetrically. The grains are parallel to the middle core board of the central two layers, and the grains can be also arranged as vertical to the middle core board of the central two layers. Between said core layer and said surface layer, it can also comprise sub-surface layer, namely balanced layer. The balanced layer is composed of veneers with the thickness of 1 to 3 mm, and the veneer of the sub-core board layer is arranged as vertical to the wood grain of veneer in core layer and surface layer, the effect is to present the transverse warping of the core layer board.

Figure 5:
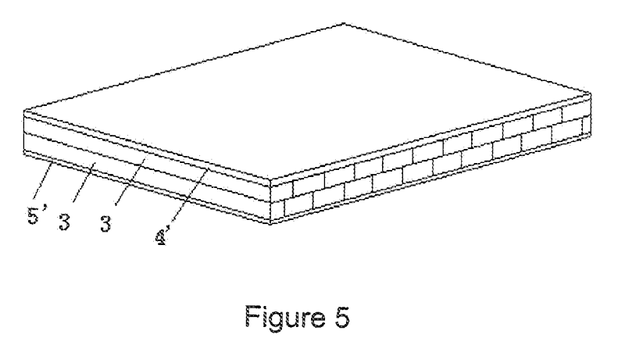
FIG. 5 is the diagram for even-ply solid wood composite panel made of ultra-thick veneers

In the present example, as shown in FIG. 5, said core layer can be composed of ultra-thick veneer (see the appended drawing reference sign 3) with the thickness of 6 to 12 mm, which is made of inferiority wood, such as poplar, Chinese fir, *cryptomeria, metasequoia*, spruce, and so on; said surface layer (decorative layer) can be made of veneer with the thickness of 0.2 to 1.5 mm (see the appended drawing reference signs 4' and 5'), and the decorative overlay is made by the peeling of precious dicotyledonous wood, such as teak, *dalbergia hupeana*, keruing wood, and so on.

If sub-surface layer is arranged between core layer and surface layer, sub-surface layer (balanced layer) is composed of two layers of veneers with the thickness of 1 to 3 mm, i.e., one layer is arranged individually on the two sides of the core layer, and the veneer is made of plantation fast growing wood (not shown in the figures), such as poplar, birch, eucalypt, and so on.

The ultra-thick veneers used in core layer are the veneers by peeling logs, and punctate or line segment cracks are formed in the direction along the grain of the loose sides of the veneers (as shown in FIG. 2).

| Raw materials | Thickness of panels mm | Density g/cm$^3$ | MOE/MPa cross the grain | MOE/MPa along the grain | MOR/MPa cross the grain | MOR/MPa along the grain | Glue strength |
|---|---|---|---|---|---|---|---|
| *Eucalyptus* plywood | 90 | 0.6 | 4000 | 9000 | 9000 | 70 | 0.21 |
| Glued laminated bamboo/*eucalypstus* composite panels | 90 | 0.7 | 4078 | 10000 | 10000 | 90 | 1.21 |
| Bamboo scrimber/*eucalyptus* composite panels | 90 | 0.8 | 4143 | 12000 | 12000 | 120 | 1.23 |

It can be seen from Table 4 that, using glued laminated bamboo and bamboo scrimber to composite with eucalyptus, the MOE and MOR of bamboo/eucalyptus composite panels along the grain increase.

The following examples provided in present invention are solid wood composite panels made of even-ply ultra-thick veneers.

For the cracks in the loose side of ultra-thick veneer used in said core layer, the average length is in a range of 20 to 50 mm, the average depth is from ⅙ to ½ of the thickness of the veneer; the average width is in a range of 0.2 to 3 mm, and the average distance is 5 to 50 mm between the cracks.

The present invention provides a manufacturing method for solid wood composite panel made of ultra-thick veneer, comprises the steps as following.

A. Veneers Manufacture

The inferiority wood, such as poplar, Chinese fir, *cryptomeria, metasequoia*, spruce, and so on, is peeling into ultra-thick veneers with the thickness of 6 to 12 mm, and said veneers are treated by stress degradation machine, and punctate or line segment cracks being formed along the grain in the loose side of the veneers, then the veneers are used as veneers for core layer.

The plantation fast growing wood (not shown in figure), such as poplar, birch, eucalypt, and so on, is peeled into common veneers with the thickness of 1 to 3 mm, then the common veneers are used as veneers for sub-surface layer.

The precious dicotyledonous wood, such as teak, *dalbergia hupeana*, keruing wood, and so on, is peeled into veneers with the thickness of 0.2 to 1.5 min, then the veneers are used as decorative veneers for surface board.

B. Drying

The above veneers are dried until the moisture content is in a range of 8 to 15%.

C. Glue Spreading

The adhesive used can be any one of the adhesives, such as urea-formaldehyde adhesive, melamine modified urea-formaldehyde adhesive, phenolic-aldehyde adhesive, isocyanate, and so on.

The glue is spread on the ultra-thick veneer and the common veneers of the surface layer. If the adhesive used is urea-formaldehyde adhesive, melamine modified urea-formaldehyde adhesive or phenolic-aldehyde adhesive, the glue spread amounts is in a range of 150 to 300 g/m$^2$. If the adhesive used is isocyanate, the glue spread is in a range of 20 to 50 g/m$^2$.

The glue is not spread on the thin veneers of the surface layers.

D. Assembling

All the loose sides of the sizing veneers are toward the symmetrical centre, and the veneers are assembled symmetrically.

All the ultra-thick glued veneers are assembled in the core layer of the panels in the direction along the grain, and two thin veneers are paved symmetrically on the upper and lower surface in the direction along the grain.

If sub-surface layer is included, and two common veneers (the thickness is in a range of 1 to 3 mm) are assembled symmetrically in the direction along the grain on the surface of the two sides of the core layer ultra-thick veneers, so as to be as sub-surface layer.

E. Hot-Pressing

The slab is hot pressed to become one flesh.

In the hot-pressing procedure, according to the type of the adhesive used, the corresponding hot-pressing temperature, hot-pressing pressure and hot-pressing time are set.

If the adhesive is urea-formaldehyde adhesive or melamine modified urea-formaldehyde adhesive, then the glue spread amount is in a range of 150 to 300 g/m$^2$, the hot-pressing temperature is in a range of 120 to 160° C., the hot-pressing pressure is in a range of 0.7 to 2 MPa, and the hot-pressing time is in a range of 0.5 to 1.6 min/mm. If the adhesive used is a phenolic-aldehyde adhesive, then the glue spread amount is in a range of 150 to 300 g/m$^2$, the hot-pressing temperature is in a range of 130 to 180° C., the hot-pressing pressure is in a range of 0.7 to 2.0 MPa, and the hot-pressing time is in a range of 0.5 to 2.0 min/mm. If the adhesive used is isocyanate, then the glue spread amount is in a range of 20 to 50 g/m$^2$ the hot-pressing temperature is in a range of 90 to 130° C., the hot-pressing pressure is in a range of 0.7 to 2.0 Mpa, and the hot-pressing time is in a range of 0.5 to 1.2 min/mm.

The solid wood composite panels made of ultra-thick veneers provided in the present invention, has advantages as following:

ultra-thick veneers are used in the core layer, which can reduce the glue layers, save the adhesive amount, and reduce the cost. If aldehyde adhesive is used, when compared with existing plywood with the same thickness, the adhesive layers can be reduced, so the formaldehyde emission can be reduced;

the inferiority wood is peeled into ultra-thick veneers with the thickness of 6 to 12 mm, which is then used to manufacture solid wood composite panels, compared with blackboard, the kerf loss can be reduced, the wood utilization ratio can be enhanced; compared with plywood made of common veneers, it is more like the solid wood;

using even-ply symmetrical structure, and the ultra-thick veneers in the core layer with stress degradation treatment, which are beneficial to balance the inner stress, thus reduce the defects of the composite panels, such as warping, deformation, and so on;

the veneers are with stress degradation treatment, firstly, the transverse stress of the ultra-thick veneers is weakened, therefore, the problems such as warping, deformation, and so on, can be avoided; secondly, after stress degradation treatment, the surface stress can be released, then the loss caused by veneer broken in the subsequent procedures, such as drying, glue spreading procedure, assembling procedure, and so on, can be lowered, thus the wood utilization ratio can be enhanced; lastly, after stress degradation treatment, punctate or line segment cracks formed in the surface of the veneer, which can increase the specific surface area, and reduce the resistance that the water is discharged from wood, thus can increase the veneer drying rate and reduce the energy consumption in veneer drying.

The following examples are solid wood composite panels made of odd-ply ultra-thick veneers.

A. Veneers Manufacture

Figure 6:
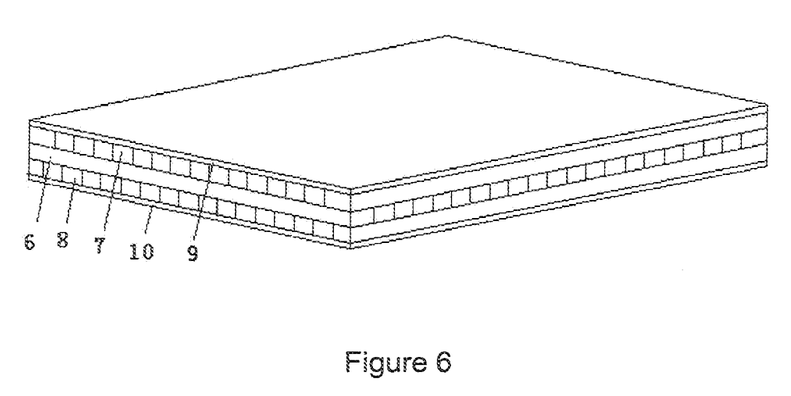

The inferiority wood, such as *pinus massoniana* lamb, eucalyptus, hemlock poplar, and so on, is peeling into ultra-thick veneers with the thickness of 6 to 12 mm (as shown in FIG. 6, see the appended drawing reference signs 6, 7, and 8), and said veneers (the appended drawing reference signs 6, 7, and 8) are treaded by the stress degradation machine, punctate or line segment cracks being formed along the grain in the loose sides of the veneers, then the veneers are used as veneers for core layer.

The dicotyedonous wood, such as paulownia, birch, teak, kerning wood, and so on, is peeled into veneers with the thickness of 0.6 to 1.5 mm (the appended drawing reference signs 8 and 9), and then the veneers are used as decorative veneers for surface board.

If sub-surface layer is arranged between core layer and surface layer, sub-surface layer (balanced layer) is composed of two layers of veneers with the thickness of 1 to 3 mm, i.e., one layer is arranged individually on the two sides of the core layer, and the veneer is made of plantation fast growing wood (not shown in the figures), such as poplar, birch, eucalypt, and so on.

B. Drying

The above veneers are dried until the moisture content is in a range of 8 to 15%.

C. Glue Spreading

The adhesive used can be any one of the adhesives, such as urea-formaldehyde adhesive, melamine modified urea-formaldehyde adhesive, phenolic-aldehyde adhesive, isocyanate, and so on.

The glue is spread on the ultra-thick veneer and the common veneers of the surface layer. If the adhesive used is urea-formaldehyde adhesive, melamine modified urea-formaldehyde adhesive or phenolic-aldehyde adhesive, the glue spread amounts is in a range of 150 to 300 g/m². If the adhesive used is isocyanate, the glue spread is in a range of 20 to 50 g/m².

The glue is not spread on the thin veneers of the surface layers.

D. Assembling

All the loose sides of the sizing veneers are toward the symmetrical centre, and the veneers are assembled symmetrically.

The above sizing ultra-thick veneers are used as the core layer, and assembled with cross structure, Said core layer is composed of odd-ply of veneers, such as 3-ply, 5-ply, 7-ply, and so on. The surface layers are composed of the veneers without gluing with the thickness of 0.6 to 1.5 mm, and are assembled with cross-structure against the veneers of the sub-surface layer. In the present example, the core layer has three layers (the appended drawing reference signs 6, 7 and 8), and assembled with cross structure, the surface layer veneers (the appended drawing reference signs 9 and 10) are arranged on the outside of the core layer, as shown in FIG. 6. Sub-surface layer can be arranged between core layer and surface layer (not shown in the figures); the veneers of the sub-surface layer are arranged as vertical or interlaced to the wood grain of veneer in core layer and surface layer.

E. Hot-Pressing

The hot-pressing procedure and other procedures are the same as the foregoing examples of the solid wood composite panels made of even-ply ultra-thick veneers.

What is claimed is:

1. An ultra-thick wood/bamboo composite panel, comprising core board, surface board and back board, wherein said core board is comprised of several ultra-thick peeling veneers, each veneer having a thickness of 6 to 12 mm; both said surface board and said back board are made of bamboo; veneers of contiguous layer in said core board are assembled with parallel structure or cross structure; said ultra-thick veneers constituting the core board are veneers with stress degradation treatment, punctate or line segment cracks are formed along grain of the loose side of said veneer in each layer, and average length is in a range of 20 to 50 mm and average depth is from ¼ to ½ of veneer thickness for said cracks in the loose side of said veneer; and a glue layer is arranged between adjacent veneers.

2. An ultra-thick wood/bamboo composite panel according to claim 1, wherein for said cracks in the loose side of said veneer, average width is in a range of 0.2 to 3 mm, and average distance between the cracks is from 5 to 50 mm.

3. An ultra-thick wood/bamboo composite panel according to claim 1, wherein total thickness of said wood/bamboo composite panel is in a range of 45 to 90 mm.

4. An ultra-thick wood/bamboo composite panel according to claim 1, wherein for said wood/bamboo composite panel, thickness ratio of the bamboo as surface board and back board to the wood is from 1:10 to 2:1.

5. An ultra-thick wood/bamboo composite panel according to claim 1, wherein said bamboo is bamboo scrimber with thickness of 5 to 20 mm, or glued laminated bamboo with thickness of 5 to 20 mm.

6. An ultra-thick wood/bamboo composite panel according to claim 1, wherein the glue layer between lamellae in said ultra-thick wood/bamboo composite panel is aqueous macromolecule isocyanate adhesive, and glue spread amount is in a range of 80 to 300 g/m².

7. An ultra-thick wood/bamboo composite panel according to claim 1, wherein the glue layer between lamellae in said ultra-thick wood/bamboo composite panel is resorcinol adhesive, and glue spread amount is in a range of 150 to 300 g/m².

8. A manufacturing method for ultra-thick wood/bamboo composite panel according to claim 1, comprising raw material preparation procedure, glue spreading procedure, assembling procedure, forming procedure and maintenance procedure, (1) raw material preparation procedure wherein the raw material preparation procedure includes preparation of bamboo, peeling of veneer, stress degradation treatment of veneer, and glue regulating, wherein the preparation of bamboo includes preparation of bamboo scrimber and preparation of glued laminated bamboo;

1.1 bamboo is made into bamboo scrimber or glued laminated bamboo to be surface board and back board;

1.2 log is peeled into ultra-thick veneers with thickness of 6 to 12 mm, punctate or line segment cracks are formed along grain of the loose side of said veneer in each layer by stress degradation using stress degradation machine, and average length is in a range of 20 to 50 mm and average depth is from ¼ to ½ of veneer thickness for said cracks in the loose side of said veneer, after drying treatment, moisture content of the veneer is in a range of 7 to 25%;

1.3 adhesive used is aqueous macromolecule isocyanate adhesive, comprising main agent and cross linking agent, the main agent is styrene-butadiene latex, vinyl acetate-ethylene copolymer emulsion or polyacrylic acid emulsion, and the cross linking agent is polymerized isocyanate; amount of cross linking agent is from 5 to 20% of that of the main agent, after stirring uniformly, aqueous macromolecule isocyanate adhesive is formed; or adhesive used is resorcinol adhesive, comprising main agent and curing agent, the main agent is linear resorcinol resin containing alcohol, and the curing agent is polyformaldehyde; amount of polyformaldehyde is 8 to 15% of that of main agent, after stirring uniformly, resorcinol adhesive is formed;

(2) glue spreading procedure wherein aqueous macromolecule isocyanate adhesive or resorcinol adhesive is spread uniformly on a surface of the stress degraded wood veneer and on a surface of bamboo scrimber or glued laminated bamboo; glue spread amount in each glue layer is from 80 to 300 g/m² for aqueous macromolecule isocyanate adhesive, and glue spread in each glue layer is from 150 to 300 g/m² for resorcinol adhesive;

(3) assembling procedure wherein the bamboo scrimber or glued laminated bamboo and the stress degraded veneer are assembled with parallel structure or cross structure, several said stress degraded veneers are assembled together to form the core board, bamboo scrimber or glued laminated bamboo are placed on two sides of the core board so as to be used as surface board and back board, and then a slab is formed; and (4) forming procedure wherein said slab is sent to cold pressing machine to cold press, cold pressing pressure is in a range of 1 to 5 MPa, cold pressing time is in a range of 20 to 60 min, and cold pressing temperature is room temperature.

9. A manufacturing method for ultra-thick wood/bamboo composite panel according to claim 8, wherein a fifth procedure is arranged after the forming procedure:

(5) maintenance procedure
wherein said slab is stacked in an oven at a temperature of 60 to 120° C. with a humidity of 60 to 98%, maintenance time is in a range of 1 to 5 h, and maintenance pressure is in a range of 0.6 to 2 MPa.

10. A solid wood composite panel made of ultra-thick veneers, comprising surface layer of two outer surfaces and core layer between the outer surfaces, and adhesive arranged between veneers in each layer; wherein
said core layer is comprised of several ultra-thick veneers, each veneer having a thickness of 6 to 12 mm, and said surface layer is comprised of veneers with thickness of 0.2 to 1.5 mm; and
the ultra-thick veneers used in said core layer are veneers made by peeling of log, and punctate or line segment cracks are formed along grain of the loose side of said veneer in each layer, and average length is in a range of 20 to 50 mm and average depth is ⅙ to ½ of veneer thickness for said cracks in the loose side of said ultra-thick veneer used in said core layer.

11. A solid wood composite panel made of ultra-thick veneer according to claim 10, wherein for said cracks in the loose side of said ultra-thick veneer used in said core layer, average width is in a range of 0.2 to 3 mm and average distance between the cracks is 5 to 50 mm.

12. A solid wood composite panel made of ultra-thick veneer according to claim 10, wherein said core layer is composed of even-ply veneers, such as 2-ply, 4-ply, 6-ply, 8-ply, and so on, and the core layer is assembled with parallel structure or cross structure; or
said core layer is composed of even-ply veneers, such as 2-ply, 4-ply, 6-ply, 8-ply, and so on, and the core board is assembled with parallel or cross structure; a sub-surface layer, which is a balanced layer, is arranged between said core layer and said surface layer, the balanced layer is composed of veneers with thickness of 1 to 3 mm, and veneer of the sub-surface layer is arranged as vertical or interlaced to wood grain of veneers in said core board and said surface layer; or
said core layer is composed of odd-ply veneer, such as 3-ply, 5-ply, 7-ply, and so on, and the core layer is assembled with parallel structure or cross structure; or
said core layer is composed of odd-ply veneer, such as 3-ply, 5-ply, 7-ply, and so on, said core layer is assembled with parallel or cross structure; a sub-surface layer, which is a balanced layer, is arranged between said core layer and said surface layer, said balanced layer is composed of veneers with thickness of 1 to 3 mm, and veneer of the sub-surface layer is arranged as vertical or interlaced to wood grain of veneer in said core layer and said surface layer.

13. A solid wood composite panel made of ultra-thick veneer according to claim 12, wherein two veneers with the loose side jointed relatively or one veneer in symmetrical centre of said core board are a middle core board, all the loose sides of veneers in each layer outside of the middle core board are toward the middle core board, and veneers are assembled symmetrically, with grains parallel to central two layers, or vertical or interlaced to central two layers.

14. A solid wood composite panel made of ultra-thick veneer according to claim 10, wherein said core layer is made of inferior wood selected from the group consisting of poplar, Chinese fir, *cryptomeria, metasequoia* and spruce; and said surface layer is made of teak, *dalbergia hupeana* or keruing wood.

15. A solid wood composite panel made of ultra-thick veneer according to claim 12, wherein said sub-surface layer is composed of common veneers made of poplar, birch or eucalypt.

16. A manufacturing method for solid wood composite panel made of ultra-thick veneers according to claim 10, comprising the steps:
A. veneers manufacture
wherein wood for making core layer veneers, is peeled into ultra-thick veneers with thickness of 6 to 12 mm, said veneers are untwined in stress degradation equipment, punctate or line segment cracks being formed along grain in the loose side of said veneer, average length is in a range of 20 to 50 mm and average depth is ⅙ to ½ of veneer thickness for said cracks, then the veneers are used as veneers for core layer;
wood for making surface board, is peeled into veneers with thickness of 0.2 to 1.5 mm, then the veneers are used as decorative veneers for surface board;
B. drying
wherein the veneers are dried until moisture content is in a range of 8 to 15%;
C. glue spread
wherein double-sided sizing is carried out on the ultra-thick veneers of the core layer, and gluing is not on veneers of the surface layer;
D. assembling
wherein all said sizing ultra-thick veneers are assembled to form the core layer, and two thin veneers of the surface layer are assembled symmetrically on upper and lower surfaces of a slab as vertical or interlaced to wood grain of the core board; and
E. hot-pressing
the slab is hot pressed to become one flesh.

17. A manufacturing method for solid wood composite panel made of ultra-thick veneers according to claim 16, wherein for a sub-surface layer between said core layer and said surface layer, in the veneers manufacture procedure A, wood for making the sub-surface board is peeled into veneers with thickness of 1 to 3 mm; in the drying procedure B, the veneers are also dried until moisture content is in a range of 8 to 15%; in the glue spreading procedure C, the double-sided sizing is used; then in the assembling procedure D, the veneers for the sub-surface layer are arranged between core layer veneers and surface layer veneers as wood grain vertical or interlaced to wood grain of the core layer and the surface layer.

18. A manufacturing method for solid wood composite panel made of ultra-thick veneer according to claim 16, wherein in the assembling procedure, said core layer is assembled as following: two veneers with the loose sides jointed relatively or one veneer in symmetrical centre of said core board are a middle core board, all the loose sides of veneers in each layer outside of the middle core board are toward the middle core board, and veneers are assembled symmetrically with grains parallel to central two layers, or vertical or interlaced to central two layers.

19. A manufacturing method for solid wood composite panel made of ultra-thick veneer according to claim 16, wherein adhesive used is an urea-formaldehyde resin or melamine modified urea-formaldehyde resin, hot-pressing time is in a range of 0.5 to 1.6 min/mm, hot-pressing pressure is in a range of 0.7 to 2 MPa, hot-pressing temperature is in a range of 120 to 160° C., and glue spread amount is in a range of 150 to 300 g/m²; or adhesive used is a phenolic-aldehyde adhesive, glue spread amount is in a range of 150 to 300 g/m², hot-pressing time is in a range of 0.5 to 2.0 min/mm, hot-pressing temperature is in a range of 130 to 180° C., and hot-pressing pressure is in a range of 0.7 to 2.0 MPa; or adhesive used is isocyanate, glue spread amount is in a range of 20 to 50 g/m², hot-pressing time is in a range of 0.5 to 1.2 min/mm, hot-pressing temperature is in a range of 90 to 130° C., and hot-pressing pressure is in a range of 0.7 to 2.0 MPa.

* * * * *